United States Patent [19]

Meyers

[11] Patent Number: 4,766,298
[45] Date of Patent: Aug. 23, 1988

[54] LOW-PROFILE PORTABLE UPC OPTICAL SCANNER

[75] Inventor: Thomas J. Meyers, St. Clairsville, Ohio

[73] Assignee: NCR Corporation, Dayton, Ohio

[21] Appl. No.: 929,112

[22] Filed: Nov. 10, 1986

[51] Int. Cl.$^4$ .............................................. G06K 7/14
[52] U.S. Cl. ................................... 235/462; 235/467; 235/470; 250/566
[58] Field of Search ............... 235/454, 462, 463, 467, 235/470, 473, 380; 250/566, 568

[56] References Cited

U.S. PATENT DOCUMENTS

| | | | |
|---|---|---|---|
| 3,456,997 | 7/1969 | Stites et al. | 250/566 |
| 3,584,779 | 6/1971 | Kessler et al. | 235/61.11 |
| 3,663,800 | 5/1972 | Myer et al. | 235/467 X |
| 3,711,723 | 1/1973 | McMurtry | 250/219 D |
| 3,728,677 | 4/1973 | Munson | 235/463 X |
| 3,826,900 | 7/1974 | Moellering | 235/61.11 E |
| 3,947,816 | 3/1976 | Rabedeau | 250/568 |
| 4,251,798 | 2/1981 | Swartz et al. | 340/146.3 F |
| 4,286,145 | 8/1981 | Palmer | 235/454 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,418,276 | 11/1983 | Yatsunami | 235/462 |
| 4,431,912 | 2/1984 | Dickson et al. | 235/462 X |
| 4,460,120 | 7/1984 | Shepard et al. | 235/472 |
| 4,550,247 | 10/1985 | Winter et al. | 235/472 |
| 4,560,862 | 12/1985 | Eastman et al. | 235/467 |
| 4,570,057 | 2/1986 | Chadima, Jr. et al. | 235/472 |
| 4,575,625 | 3/1986 | Knowles | 235/467 |

FOREIGN PATENT DOCUMENTS 0036781 9/1981 European Pat. Off. .
0140411 5/1985 European Pat. Off. .
2074022 10/1981 United Kingdom .

Primary Examiner—Philip H. Leung
Attorney, Agent, or Firm—Wilbert Hawk, Jr.; Albert L. Sessler, Jr.; Richard W. Lavin

[57] ABSTRACT

A portable, stand-alone desk-top, optical scanning apparatus includes a first housing member positioned on the top surface of a checkout counter in which is mounted on the floor portion of the housing member, a light emitting element for projecting scanning light beams within the housing member, and a floor-mounted multi-faceted rotating mirror for directing the light beams at a plurality of floor-mounted twisted mirror members which reflect the light beams through an aperture in the cover portion of the housing member, said light beams forming a pattern for scanning a bar code label on a merchandise item positioned on top of the housing member adjacent the aperture. Light reflected from the label is directed back through the housing member towards a photodetector which generates electrical signals for processing by an electrical circuit located within the housing. A second housing member remotely positioned from said first housing member contains a power supply for operating the scanning apparatus and a laser for generating the light beams. A cable transmits the electrical power and the light beams to the light emitting element from the second housing member.

13 Claims, 3 Drawing Sheets

LOW-PROFILE PORTABLE UPC OPTICAL SCANNER

BACKGROUND OF THE INVENTION

I. Field of the Invention

The present invention relates to optical scanning systems and more particularly to an improved optical scanning system which can be removably positioned on a checkout counter for use in a checkout operation.

II. Description of the Prior Art

In present-day merchandising point-of-sale operations, data pertaining to the purchase of a merchandise item is obtained by reading data encoded indicia such as a bar code printed on the merchandise item. In order to standardize the bar codes used in various point-of-sale readout systems, the grocery industry has adopted a uniform product code (UPC) which is in the form of a bar code. Reading systems which have been constructed to read this bar code include hand-held wands which are moved across the bar code and stationary optical reader systems normally located within the cabinet structure of a checkout counter and in which the bar code is read when a purchased merchandise item is moved across a window constituting the scanning area of the counter, which movement is part of the process of loading the item in a baggage cart. There has arisen a need for a scanning system to be installed in a checkout counter in which the operator is required to be in a sitting position at a checkout counter having a table-like construction.

The background art known to the applicant at the time of the filing of this application is as follows:

U.S. Pat. No. 3,584,779, Optical Data Sensing System, by C. Kessler et al.;

U.S. Pat. No. 3,711,723, Optical System For Optical Fiber Bundle Scanning Apparatus, by D. McMurtry;

U.S. Pat. No. 3,728,677, Rotation-Independent Reading Of Rectangular Insignia, by J. Munson;

U.S. Pat. No. 4,369,361, Portable, Stand-Alone, Desk-Top Laser Scanning Workstation For Intelligent Data Acquisition Terminal And Method Of Scanning, by J. Swartz et al.

U.S. Pat. No. 4,418,276, Optical Bar Code Reader, by K. Yatesunami; and

U.S. Pat. No. 4,560,862, System For Optical Scanning Over A Large Depth Of Field, by J. Eastman et al.

SUMMARY OF THE INVENTION

An optical scanning system is provided which comprises a portable scanning enclosure and a remote power enclosure coupled to the scanning enclosure by an optical-electrical cable. The scanning enclosure which is constructed to provide a low-profile configuration includes a miniature rotating mirror, an optical-electrical connector, a printed current board, a pair of twisted mirrors, a half-silvered mirror and a miniature focusing lens. The power enclosure includes a laser member, a power supply and a printed circuit board. An optical-electrical cable connects the two enclosures. The laser beam from the laser member enters the scanning enclosure at the optical-electrical connector and passes through the half-silvered mirror where it is reflected off the rotating mirror in a direction to strike one of the twisted mirrors from where it is reflected through a window in the cover of the enclosure at the object being scanned. The reflected laser beam from the scanned object is then returned along the same path until it strikes the half-silvered mirror where it is reflected to the lens which directs the laser beam to a light sensitive detector which converts the received laser beam to electrical signals. The electrical signals generated by the detector are first digitized by circuits on the circuit board mounted in the scanning enclosure and then transmitted over the attached cable to the power enclosure where the digitized signals are processed by circuits on the circuit board mounted in the power enclosure for transmission to a remote computer.

It is therefor a principal object of this invention to provide a low-profile optical scanning system which can be placed on a supporting structure for processing merchandise items which are moved past the scanning system by an operator who is sitting down at the supporting structure.

It is another object of this invention to provide an optical scanning system in which the light source, the processing logic and the power supply are physically separated from the scanning mechanism.

It is another object of this invention to provide a portable low-profile scanning system which is low in cost.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
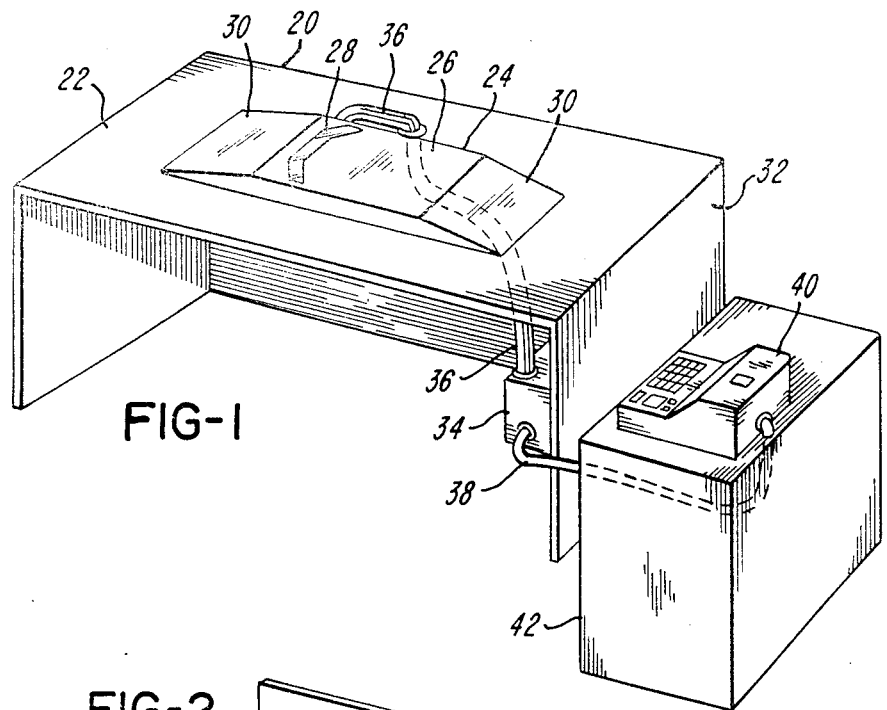
FIG. 1 is a perspective view of the low-profile scanning system of the present invention showing the location of the scanning enclosure and the power enclosure within a recessed checkout counter together with an associated terminal device which is attached to the power enclosure.

Referring now to FIG. 1 there is shown a perspective view of the optical scanning system of the present invention which includes a box-like checkout counter 20. The counter includes a top supporting member 22 on which is positioned a scanning enclosure 24 having a cover member 26 which includes a scanning window portion 28 through which scanning light beams are projected. The enclosure 24 includes a pair of sloping end portions 30 enabling a merchandise item to be moved along the surface to a position adjacent the window portion 28 wherein the scanning light beams will scan a bar code label located on the merchandise item.

Figure 8:
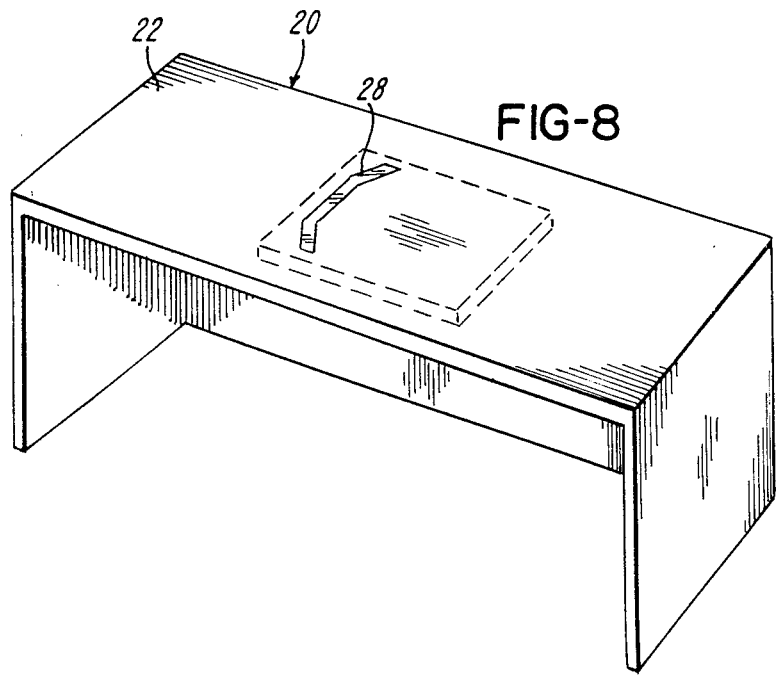
FIG. 8 is a perspective view of a checkout counter in which the scanning enclosure is mounted flush with the top surface of the counter.

Mounted to the inside surface of a sidewall panel 32 of the counter 20 is a power enclosure 34 in which is located a source of scanning light beams, a power supply and logic circuit means for processing signals generated in response to the scanning of the bar code label. A cable 36 includes an optical light pipe and electrical wires connecting the scanning enclosure 24 with the power enclosure 34. A second cable 38 connects the power enclosure 34 with a data terminal device 40 mounted on a table member 42, leaving the counter 20 free to be used only for checking out the purchased merchandise items. While the scanning enclosure 24 is shown mounted on the supporting surface 22 of the counter 20, it is obvious that the enclosure can be mounted within the supporting surface 22 of the counter 20 (FIG. 8) with the window portion 28 mounted flush with the surface 22. This latter construction will still allow the clerk to sit at the counter 20 while performing a checkout operation.

Figure 2:
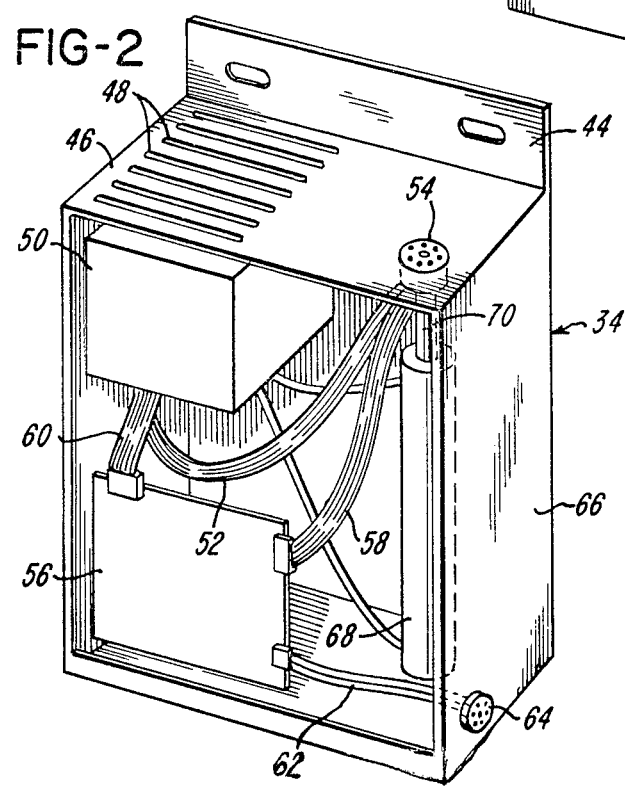
FIG. 2 is a perspective view of the power enclosure with the front wall panel removed.

Referring now to FIG. 2, there is shown a perspective view of the power enclosure 34 which includes a hanger panel 44 for hanging the enclosure to the sidewall panel 32 of the counter 20. Mounted adjacent a top wall panel 46 of the enclosure 34 which includes a plurality of air vents 48 is a power supply 50 for supplying the power to the scanning enclosure 24 over electrical wires 52 which are connected to an electrical connector 54 mounted in the top wall panel 46 of the enclosure 34. The cable 36 (FIG. 1) is secured to the connector 54 for transmitting power to the enclosure 24. Also mounted in the enclosure 34 is a printed circuit board 56 on which are mounted logic circuit elements such as I.C. chips (not shown) for processing electrical signals received from the scanner enclosure 24 over wires 58 by means of the cable 36 and the connector 54. Power is supplied to the printed circuit board 56 over wires 60 from the power supply 50. Signals generated by the electrical circuits on the circuit board 56 are transmitted over a cable 62 to a second electrical connector 64 mounted on a side wall panel 66 of the enclosure 34. The cable (FIG. 1) 38 is connected to the connector 64 for transmitting signals to the terminal device 40 (FIG. 1). Mounted adjacent the side wall panel 66 is a 50-80 milliwatt helium-neon laser 68 having an optical light tube 70 connected to the connector 54 for transmitting the light beams from the laser over the cable 36 (FIG. 1) to the scanning enclosure 24.

Figure 3:
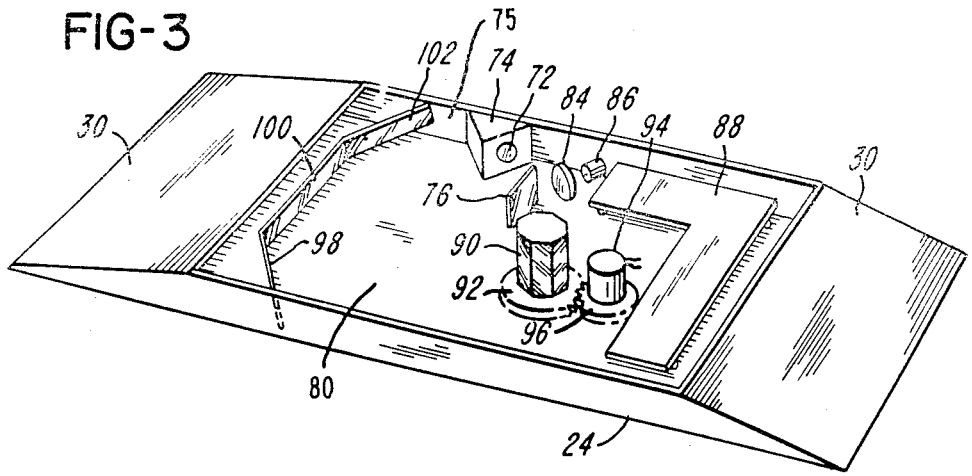
FIG. 3 is a perspective view of the scanning enclosure with the cover removed.
Figure 7:
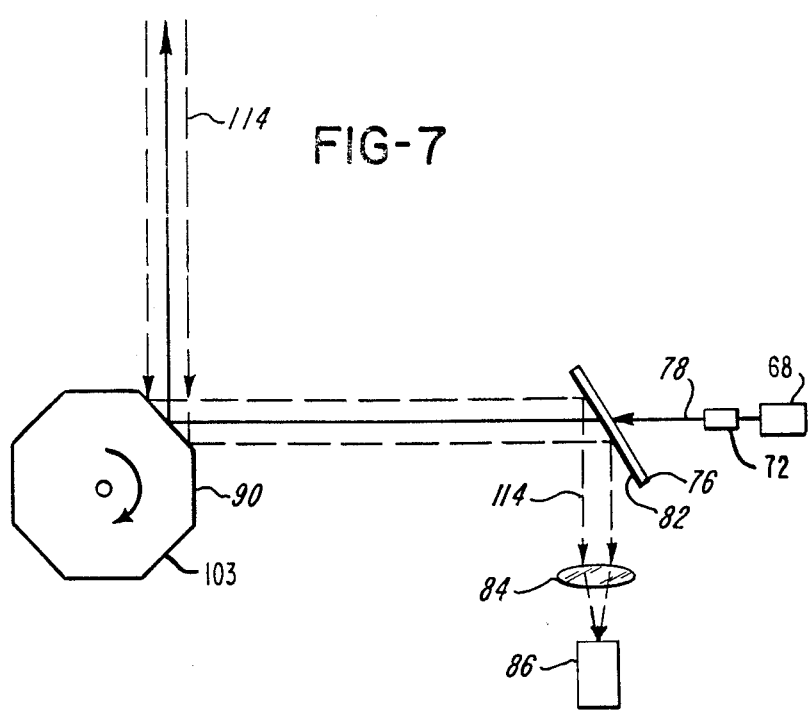
FIG. 7 is a schematic representation of the path of the reflected laser beams from the bar code label.

Referring now to FIGS. 3 and 7, there are disclosed details of the scanning enclosure 24. As shown in FIG. 3, the enclosure comprises a boxed-type structure having a pair of sloping side portions 30 (FIG. 1) which facilitates the movement of a merchandise item across the top of the enclosure. Included in the enclosure is a light emitting element 72 mounted in a support member 74 secured to a front wall 75 of the enclosure. The element 72 is connected by the cable 36 to connector 54 (FIG. 2). The element 72 has an optical portion through which a light beam 78 (FIG. 7) received from the laser 68 (FIG. 2) is projected into the enclosure 24. Mounted adjacent the element 72 is an upstanding transparent member 76 having one side 82 silver coated. The member 76 is secured to the floor member 80 of the enclosure 34. As best seen in FIG. 7, the member 76 is mounted at a 45 degree angle to the line of direction of the light beam 78.

Mounted adjacent the member 76 and secured to the floor member 80 is a focusing lens 84 which, as will be described more fully hereinafter, will focus reflected light beams received from the silvered side 82 of the member 76 on a photodetector 86 mounted on the floor member 80 adjacent the lens 84. The photodetector 86 is connected to a printed circuit board 88 (FIG. 3), mounted on the floor member 80 of the enclosure 24, which includes an A/D converter (not shown) for digitizing the analog signals received from the photodetector 86 in a manner that is well known in the art.

Figure 4:
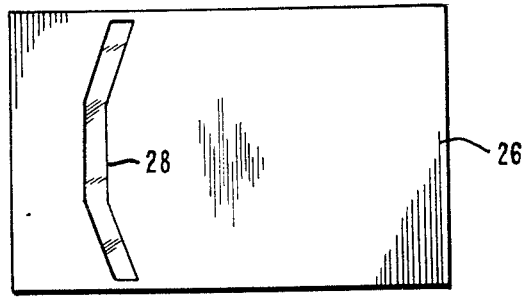
FIG. 4 is a top view of the scanning enclosure cover member.

Mounted adjacent the member 76 and in line with the path of the light beams 78 (FIG. 7) projected from the connector 72 is a rotatably mounted multifaceted mirror 90 mounted on the floor member 80 by means of a driven gear member 92. Located adjacent the mirror 90 is a miniature motor 94 mounted on the floor member 80 which rotates a driving gear member 96. The gear member 96 engages the gear member 92 for rotating the mirror 90 in a clockwise direction as viewed in FIG. 7. Associated with the mirror 90 are a plurality of mirrors 98-102 inclusive mounted on the floor member 80 at one side of the enclosure 24. The mirrors 98 and 102 are twisted along its length providing a variable angle with respect to the floor member 80 while the mirror 100 is oriented at a constant angle. The cover member 26 (FIG. 4) which includes the window portion 28 is secured to the top of the enclosure 24.

Figure 5:
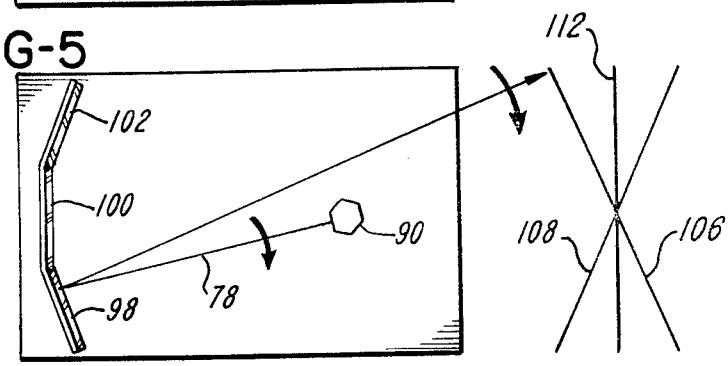
FIG. 5 is a top view of the scanning enclosure with the cover member removed showing a schematic representation of the beam scanning pattern generated by the, twisted mirrors.
Figure 6:
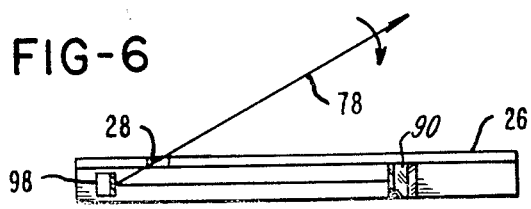
FIG. 6 is a side view of the scanning enclosure of FIG. 5 including the cover member showing a schematic representation of the beam scanning pattern.

In the operation of the scanning system of the present invention, the light beams 78 (FIG. 7) outputted from the connector 72 pass through the transparent member 76 to engage one of the facets 103 of the rotating mirror 90 which reflects the light beams across the mirrors 98-102 inclusive. The mirrors 98 and 102 will reflect the light beams through the window portion 28 to provide the scan lines 106 and 108 respectively (FIG. 5) of a scanning pattern projected adjacent the top surface of the cover member 26 while the mirror 100 will provide the horizontal scan line 112 of the pattern. The light beams 114 (FIG. 7) reflected from the bar code label on the merchandise item are directed back through the window portion 28, the mirrors 98-102 inclusive and one of the facets 103 of the rotating mirror 90 towards the silvered side 82 of the member 76. The side 82 of the member 76 (FIG. 7) will deflect the reflected light beams 114 towards the lens 84 which focuses the light beams at the photodetector 86. As is well-known in the art, the bar code label comprises a plurality of light and dark bars (not shown) printed on a label which, when scanned by the scanning apparatus, will generate a specific pulse wave-form. The light reflected from the bar code label is first scattered and then portions of the reflected light are directed back toward the photodetector 86. The photodetector 86 will, in response to receiving the changes in the light intensity of the reflected light beams 114, generate electrical signals which are transmitted to the printed circuit board 88 (FIG. 3) where the A/D converter (not shown) will digitize the analog signals. These signals are then transmitted over the cable 36 (FIG. 1) to the printed circuit board 56 (FIG. 2) located in the power enclosure 34. The logic circuits on the board 56 will process the digitized signals received from the scanning enclosure 24 and transmit the signals to the data terminal device 40 where the information is displayed. It will thus be seen there is disclosed an optical scanning system which allows a checkout operation to occur on a checkout counter where the operator may be in a sitting position.

Although the preferred embodiment of the present invention has been described herein, it is not intended that the invention be restricted thereto but that it be limited only by the true spirit and scope of the appended claims.

What is claimed is:

1. In an optical scanning system, an optical scanner checkout station for reading bar code symbols on objects passing over the checkout station comprising:
   an elongated portable housing structure which includes a pair of wall members, a floor member and a cover member having an aperture therein through which scanning light beams are projected and portions over which a merchandise item bearing a coded label is supported for movement past the aperture;
   a supporting surface on which the housing structure is positioned;
   a source of light beams mounted away from the housing structure;
   light emitting means mounted in one of said wall members for transmitting received light beams from said source into said housing structure along a defined path;
   light transmitting means connected between the source of light beams and the light emitting means for transmitting light beams to the light emitting means;
   optical means mounted on said floor member adjacent said light emitting means in said defined path for transmitting the light beams from the light emitting means along a first light path;
   scanning means mounted on said floor member and in the first light path for cyclically sweeping the light beam along a second light path; and
   reflecting means mounted in said second light path and at an angle to said floor member adjacent the cover member for reflecting the light beams through said aperture in the cover member for scanning a bar code label positioned adjacent said aperture.

2. The checkout station of claim 1 in which said optical means includes a transparent member having a transparent surface receiving said light beams and a reflecting surface for reflecting light beams reflected from the bar code label along a third light path.

3. The checkout station of claim 2 in which said scanning means includes a multifaceted mirror member rotatably mounted on said floor member in said first light path and drive means mounted on said floor member adjacent said multifaceted member for rotating said multifaceted member whereby said multifaceted member will reflect the light beams along said second light path.

4. The checkout station of claim 3 in which said housing structure further includes detector means mounted on said floor member in said third path for generating electrical signals in response to receiving the reflected light beams from said transparent member.

5. The checkout station of claim 4 which further inclues a printed circuit board mounted to said floor member, said printed circuit board including circuit means connected to said detector means for processing electrical signals generated by said detector means.

6. The checkout station of claim 2 in which said reflecting surface comprises a silvered surface.

7. The checkout station of claim 1 in which said reflecting means includes a first mirror member mounted to said floor member to reflect the received light beams in a first scanning direction through said aperture and a second mirror member mounted to said floor member adjacent the first mirror member to reflect the received light beams in a second scanning direction through said aperture.

8. In an optical scanning system, a portable scanning workstation for reading bar code labels on merchandise items passing over the workstation comprising:
   a first housing member mounted on a first support member, said first housing member including a pair of wall portions, a floor portion and a cover portion including an aperture through which scanning light beams are projected, said first housing further including a sloping end portions over which a merchandise item bearing a bar coded label is moved past the aperture;
   a second housing member containing a power supply mounted on a second support member remotely positioned away from said first support member;
   a source of light beams mounted within said second housing member;
   light emitting means mounted to one of said wall portions for transmitting light received from said source of light beams along a first path within said first housing member;
   a cable member connected to said light emitting means and said source of light beams for transmitting the light beams to said light emitting means;
   a transparent member mounted to said floor portion at an angle to said first path having a first side for transmitting the light beams received from said light emitting means along said first path and a second side for reflecting light beams transmitted along said first path in the opposite direction from the light beams received from said light emitting means for deflecting the light beams along a second path;
   scanning means mounted to said floor portion in said first path for cyclically sweeping the light beams along a third path parallel to the floor portion; and
   reflecting means mounted at an angle to said floor portion in said third path for reflecting the light beam through said aperture in the cover portion for scanning a bar coded label adjacent said aperture.

9. The workstation of claim 8 in which said reflecting means includes a first elongated mirror member mounted at a first angle to said floor portion in said third path and a pair of second elongated mirror members mounted at a second angle different from said first angle to said floor portion in said third path for reflecting the light beams in a generally upward direction at different angles through said aperture forming a scanning pattern.

10. The workstation of claim 9 in which said scanning means includes a vertically extending multifaceted mirror member rotatably mounted on said floor portion in said first light path and a vertically extending drive member mounted on said floor portion adjacent said multifaceted mirror member for rotating said multifaceted mirror member whereby the mirror member will reflect the light beams along said third path.

11. The workstation of claim 10 in which light beams reflected from the coded label are directed by the first and second elongated mirror members and said multifaceted mirror member along said first path toward said second side of said transparent member, said workstation further including an optical lens member mounted on said floor portion in said second path for focusing the reflected light beams at a photodectector member mounted on said floor portion at said collection point for generating electrical signals in response to the intensity of the received reflected light beams.

12. The workstation of claim 11 which further includes a printed circuit board mounted on said floor portion, said circuit board including circuit means connected to said photodetector member for processing the electrical signals generated by said photodetector member.

13. The workstation of claim 11 in which said second side of the transparent member comprises a silvered surface.

* * * * *

UNITED STATES PATENT AND TRADEMARK OFFICE
CERTIFICATE OF CORRECTION

PATENT NO. : 4,766,298

DATED : August 23, 1988

INVENTOR(S) : Thomas J. Meyers

It is certified that error appears in the above-identified patent and that said Letters Patent is hereby corrected as shown below:

Column 5, line 37, delete "beam" and substitute --beams--.

Column 5, line 53, delete "adjucent" and substitute --adjacent--.

Column 5, line 63, delete "inclues" and substitute --includes--.

Column 6, line 16, after "housing" insert --member--.

Column 6, line 17, delete "a", first occurrence.

Signed and Sealed this

Third Day of January, 1989

Attest:

DONALD J. QUIGG

*Attesting Officer*     *Commissioner of Patents and Trademarks*